(12) United States Patent
Shimizu (10) Patent No.: US 10,620,873 B2
(45) Date of Patent: Apr. 14, 2020

(54) INFORMATION MANAGEMENT APPARATUS AND NON-TRANSITORY COMPUTER READABLE MEDIUM

(71) Applicant: FUJI XEROX CO., LTD., Tokyo (JP)

(72) Inventor: Tomoyuki Shimizu, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 114 days.

(21) Appl. No.: 15/652,256

(22) Filed: Jul. 18, 2017

(65) Prior Publication Data
US 2018/0181342 A1 Jun. 28, 2018

(30) Foreign Application Priority Data
Dec. 27, 2016 (JP) ................. 2016-252474

(51) Int. Cl.
*G06F 3/06* (2006.01)
*G06F 9/50* (2006.01)

(52) U.S. Cl.
CPC .......... *G06F 3/0652* (2013.01); *G06F 3/067* (2013.01); *G06F 3/0608* (2013.01); *G06F 3/0638* (2013.01); *G06F 3/0647* (2013.01); *G06F 9/5022* (2013.01)

(58) Field of Classification Search
CPC combination set(s) only.
See application file for complete search history.

(56) References Cited

U.S. PATENT DOCUMENTS

2015/0358406 A1* 12/2015 Scheer ................... G06F 11/30
                                                                    709/248
2017/0344900 A1* 11/2017 Alzahrani ............. G06N 20/00

FOREIGN PATENT DOCUMENTS

JP    2004-240779    8/2004
JP    2010-079842    4/2010

* cited by examiner

*Primary Examiner* — Yong J Choe
(74) *Attorney, Agent, or Firm* — JCIPRNET (57) ABSTRACT

An information management apparatus includes a controller that controls deletion of content whose history of operations performed on the content satisfies a specific condition, among content items which satisfy a predetermined condition and are moved to a different recording location.

7 Claims, 13 Drawing Sheets

PLEASE INPUT INDIVIDUAL DELETION CONDITION

| OPERATION | OPERATOR | G3ID/G4ID(FAX NUMBER) | MOVEMENT SOURCE | RETENTION PERIOD |
|---|---|---|---|---|
| | | | | |

● RETENTION PERIOD IS APPLIED TO A CASE WHERE COMBINATION IS SATISFIED

○ RETENTION PERIOD IS APPLIED TO A CASE WHERE COMBINATION IS NOT SATISFIED

INFORMATION MANAGEMENT APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-252474 filed Dec. 27, 2016.

BACKGROUND (i) Technical Field

The present invention relates to an information management apparatus and a non-transitory computer readable medium.

(ii) Related Art

A storage in a cloud has a restriction on the capacity and the number of files. Therefore, in a case where the retention period of a file exceeds a predetermined period or in a case where a predetermined operation is performed on the file, the file corresponding to these conditions is moved to a trash folder, and the free space of the movement source is increased. However, simply moving the file to the trash folder increases the number of files stored in the trash folder, and this time it is necessary to delete the files in the trash folder.

SUMMARY

However, when a method of uniformly deleting files from the trash folder is adopted, files erroneously moved to the trash folder are also deleted together. On the other hand, in a method in which the user checks the content of a file one by one before deleting the file from the trash folder, the checking operation is troublesome. Further, with a method of automatically deleting files using the type of the file and article attributes, it is not possible to exclude files that are highly likely to be used by users.

According to an aspect of the invention, there is provided an information management apparatus including a controller that controls deletion of content whose history of operations performed on the content satisfies a specific condition, among content items which satisfy a predetermined condition and are moved to a different recording location.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the accompanying drawings.

System Configuration

Figure 1:
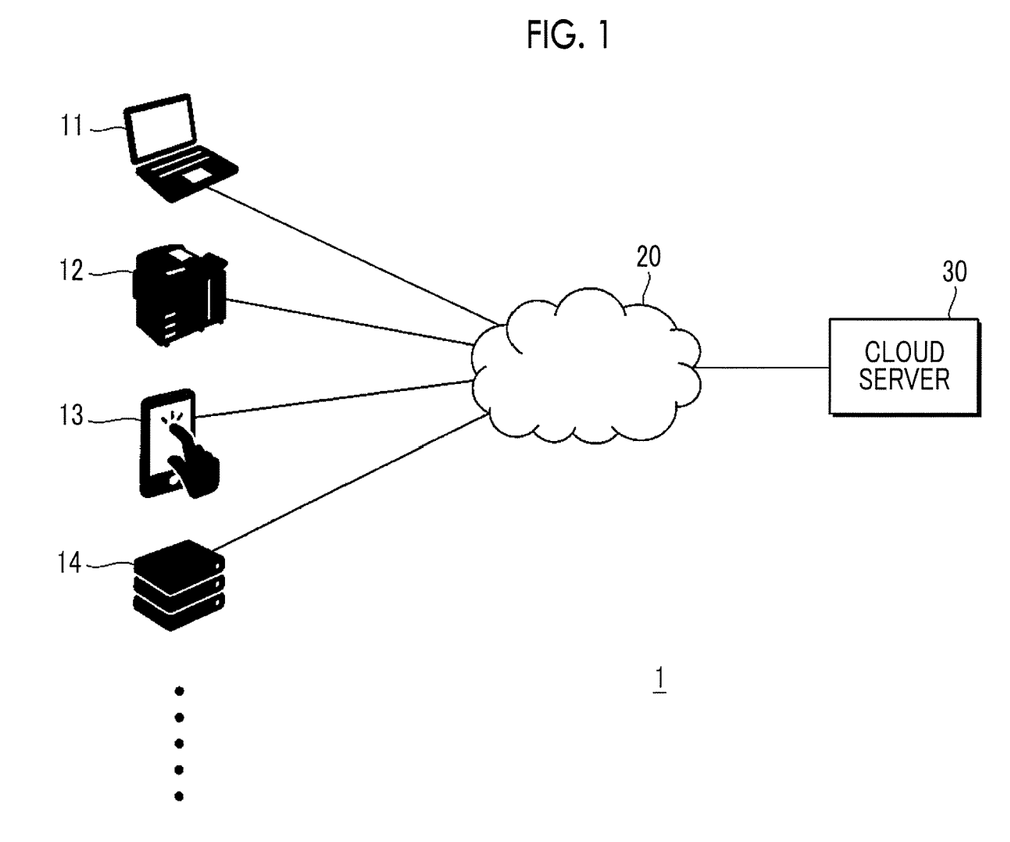
FIG. 1 is a diagram showing a configuration example of a cloud system used for providing a cloud service.

FIG. 1 is a diagram showing a configuration example of a cloud system 1 used for providing a cloud service. The cloud system 1 includes a terminal apparatus under the control of a user using a cloud service, the Internet 20 interconnecting computer networks, and a cloud server 30 under the control of a cloud service provider. In the present exemplary embodiment, it is assumed a service of storing data and documents handled on a daily basis by the user (hereinafter referred to as "content") on the Internet.

In the present exemplary embodiment, as the terminal apparatus, a computer 11 or an image forming apparatus 12 used in an office or the like, a portable information processing apparatus 13, a network attached storage (NAS) 14 which is a file server, and the like are used. The image forming apparatus 12 in the present exemplary embodiment is an apparatus which is equipped with a copy function, a scanner function, a fax transmission and reception function, a printing function, and the like. However, the image forming apparatus 12 may be an apparatus specialized for a part of these functions, for example, a scanner, a fax transmitter and receiver, a printer (including a three-dimensional printer), and an image editing apparatus. The portable information processing apparatus 13 may be, for example, a notebook computer, a tablet computer, a smartphone, a portable phone, a camera, a portable game machine, and the like.

Figure 2:
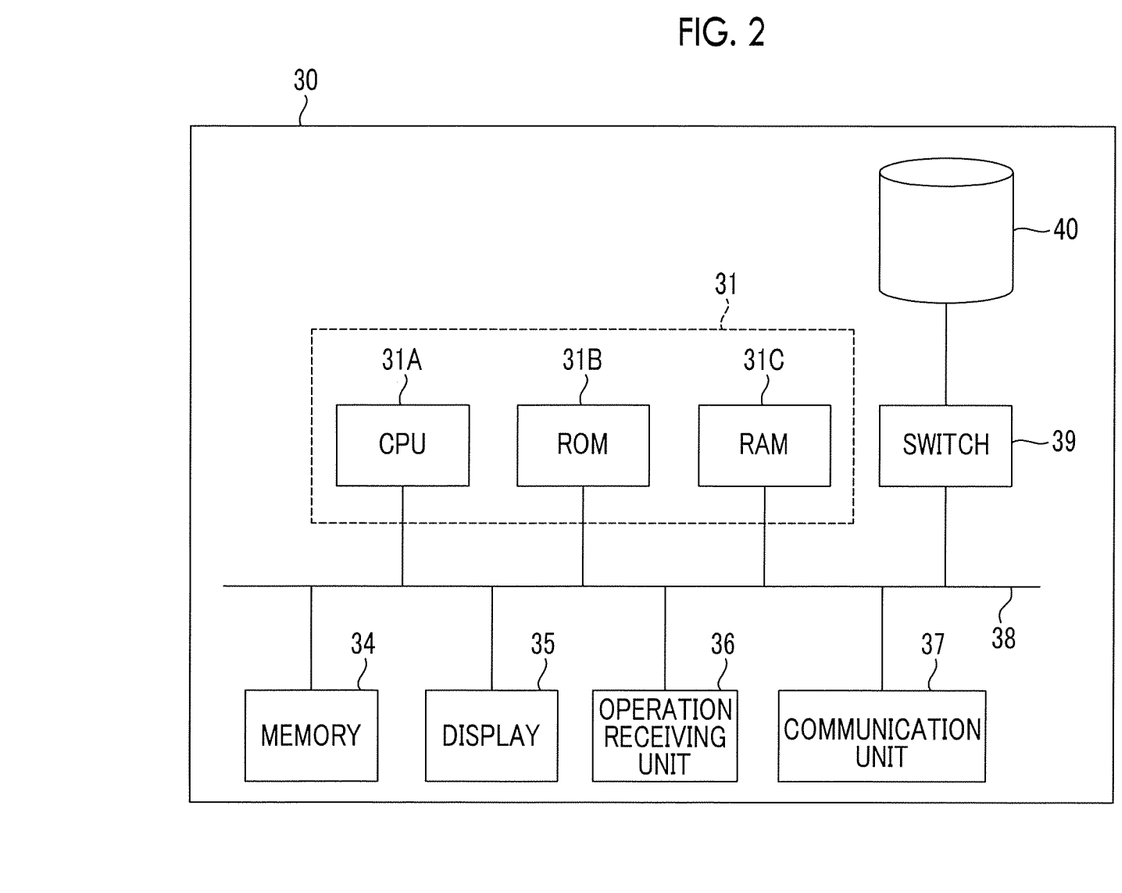
FIG. 2 is a diagram showing a configuration example of a cloud server functioning as a data center.

FIG. 2 is a diagram showing a configuration example of the cloud server 30 functioning as a data center. The cloud server 30 includes a controller 31 that controls the entire apparatus, a memory 34 that stores data related to the execution of a program, a display 35 that displays a work screen, an operation receiving unit 36 that receives an operation of an operator, and a communication unit 37 connected to a computer network. These functional units are mutually connected through a bus 38 and function as a management terminal. The management terminal is an example of an information management apparatus.

The controller 31 here is a so-called computer, and includes a central processing unit (CPU) 31A that executes programs, a read only memory (ROM) 31B that stores programs and data, such as a basic input/output system (BIOS) and firmware, a random access memory (RAM) 31C that gives a work area to a program. The controller 31 is an example of an information management apparatus in a narrow sense. Details of various functions realized by the controller 31 through execution of a program will be described later.

In addition to this, the cloud server 30 includes a switch 39 connected to the bus 38 through an interface (not shown), and a server group 40 for storing content. The server group 40 is an aggregate of servers and constitutes a server system as a whole. The cloud server 30 including the management terminal and the server group 40 is an example of an information management apparatus in a broad sense.

Figure 3:
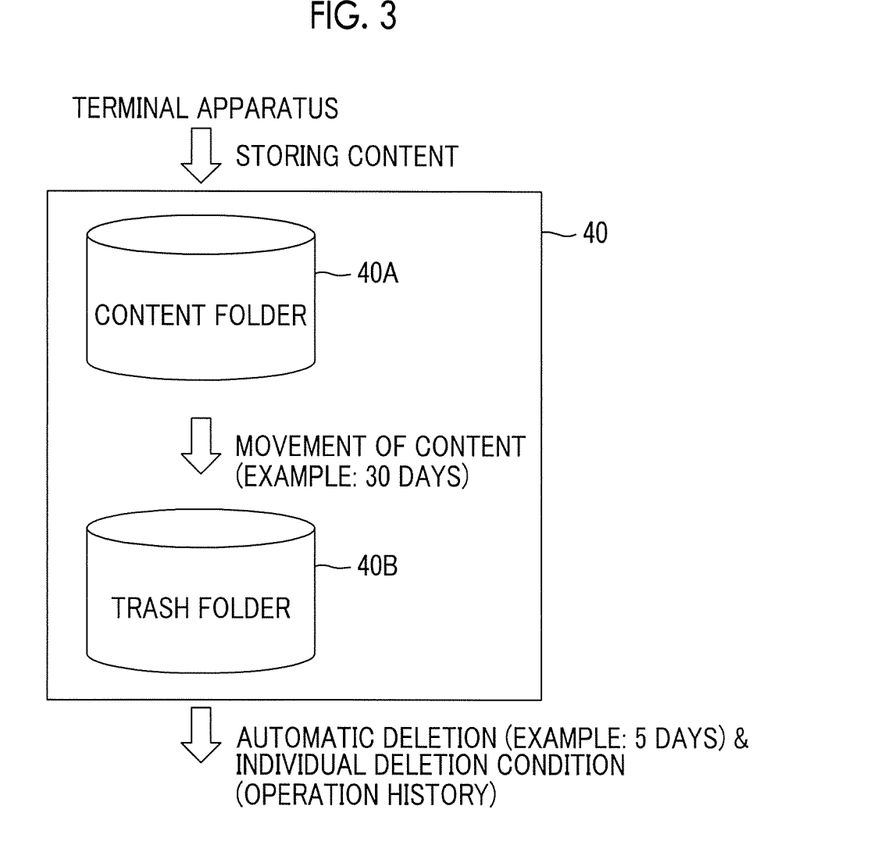
FIG. 3 is a diagram showing a logical configuration example of recording areas constituting a server group.

FIG. 3 is a diagram showing a logical configuration example of recording areas constituting the server group 40. As shown in FIG. 3, the server group 40 has one or more content folders 40A used for storing content, and a trash folder 40B to which the content deleted from the content folder 40A is moved. In many cases, the content folder 40A is managed by a hierarchical structure of plural folders. In the trash folder 40B, not only the content but also the folder are saved.

Although details will be described later, a retention period is set in each content folder 40A, and content whose retention period has passed is automatically moved to the trash folder 40B. The retention period in the exemplary embodiment is, for example, 30 days, 60 days, or indefinite, and is set by the user on the management screen. FIG. 3 shows an example in which the retention period is 30 days. In the content folder 40A, an upper limit is set for the number and capacity of content that can be stored. By this automatic movement, a free area is generated in the content folder 40A. In addition, since the content whose retention period has passed is only moved from the content folder 40A to the trash folder 40B, some items of content may be restored even after the movement. The content folder 40A in the present exemplary embodiment is an example of "recording location" in the exemplary embodiment of the invention.

A retention period is also set in the trash folder 40B. The retention period is, for example, 1 day, 3 days, 5 days, 10 days, or the like, and is set by the administrator on a management screen. The example of FIG. 3 shows an example of 5 days. The content whose retention period of the trash folder 40B has elapsed is deleted without being moved to another folder. However, in the present exemplary embodiment, the deletion of content from the trash folder 40B is controlled using deletion conditions which are set individually (hereinafter referred to as "individual deletion conditions"), in addition to the retention period set for the entire folder. It is possible to flexibly specify important content, as compared with the case of using the type of content or article attribute, by defining the individual deletion conditions by using the operation history. The trash folder 40B in the present exemplary embodiment is an example of "different recording location" in the exemplary embodiment of the invention.

Functional Configuration of Controller

Figure 4:
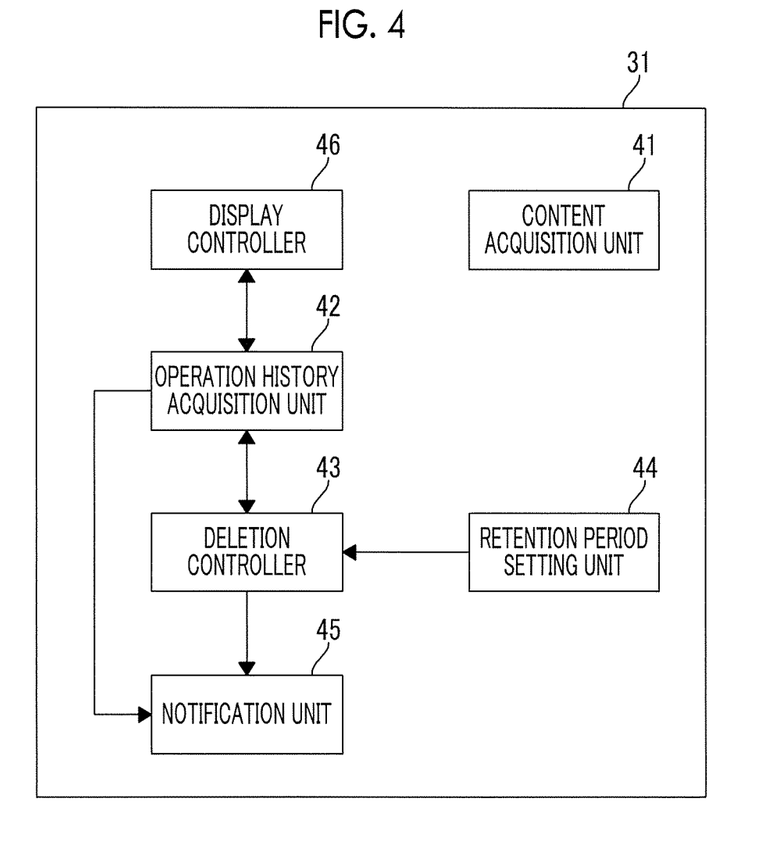
FIG. 4 is a block diagram illustrating an example of processing functions used for management of content stored in a server group, among processing functions corresponding to a controller.

Next, the processing functions used for managing the content stored in the server group 40 will be described. FIG. 4 is a block diagram illustrating an example of processing functions used for management of content stored in the server group 40, among processing functions corresponding to the controller 31. The processing function shown in FIG. 4 is realized by the CPU 31A executing a program.

The controller 31 includes a content acquisition unit 41 that stores the content acquired from the terminal apparatus in the content folder 40A which is prepared in advance. The content folder 40A is prepared for each user, terminal apparatus, application, date, and the like, for example.

The controller 31 also includes an operation history acquisition unit 42 that acquires the operation history information, with respect to the content newly stored in the content folder 40A or the content whose retention period has passed the retention period set for the content folder 40A. The operation history information is managed in the content folder 40A, for example, as a part of the content or as a separate file associated with the content. Examples of the item of the operation history information in the present exemplary embodiment include an operation, an operator, and the like.

Examples of "operation" which is one of the items constituting the operation history information include upload, download, locking, unlocking, generation, movement to the trash box, and the like. Upload refers to an operation of writing content from the terminal apparatus to the content folder 40A. As upload, there are new upload and upload by overwriting. Download refers to an operation of reading content from the content folder 40A to the terminal apparatus.

Locking is an operation of limiting access so that the content downloaded to the terminal apparatus is not downloaded to a different terminal apparatus. The lock operation is automatically executed in a case where the download is executed. By this operation, the authority of editing content is limited to one terminal apparatus. In a case where uploading is executed, unlocking is automatically executed, and other users can download the content.

Generation is an operation of newly generating content in the terminal apparatus. For example, a document received by a facsimile transceiver is the result of a "generation" operation. Movement to the trash box is an operation in the case where the movement destination is the trash folder 40B, among the operations of moving content between the folders.

The operator which is one of the items constituting the operation history information includes natural persons (for example, name, identification number, or the like) as a direct user, and a system (an automatic deletion system, a FAX transfer system, or the like). By treating the system as an operator, it is possible to distinguish between an operation based on the intention of a natural person and an operation not based on the intention of a natural person. Even if the content deleted by the natural person's operation is automatically deleted from the trash folder 40B, it is unlikely to be a problem. It may be that the content deleted by the operation of the system is stored in a recoverable state until the user's decision is made.

The controller 31 also includes a deletion controller 43 that controls deletion of content from the trash folder 40B. The deletion controller 43 determines whether to execute the deletion by comparing the retention period set for the trash folder 40B with the retention period of each piece of content. In a case of deleting the content from the trash folder 40B, the deletion controller 43 compares the operation history of each piece of content with a predetermined deletion condition (individual deletion condition), and controls the deletion of the content, based on the comparison result. The deletion controller 43 here is an example of "controller" in the exemplary embodiment of the invention.

With respect to the deletion of content, the individual deletion condition takes precedence over the retention period set for the folder. The individual deletion condition here is an example of "specific condition" in the exemplary embodiment of the invention. In a case where the operation history of one content satisfies plural individual deletion conditions, the deletion controller 43 waits for the elapse of the longer retention period and deletes the content. This function is provided for more carefully executing deletion of content from the trash folder 40B.

The controller 31 also includes a retention period setting unit 44 that receives a retention period for each folder and a retention period for defining the individual deletion condition through the management screen displayed on the display 35. In a case of being used for setting the individual deletion condition, the retention period setting unit 44 executes a process of receiving the details of the operation and the information on the operator together with the retention period. The retention period setting unit 44 here is an example of the "presentation unit" in the exemplary embodiment of the invention.

The controller 31 includes a notification unit 45 that monitors the content that is moved to the trash folder 40B after the elapse of the retention period of the content folder 40A and notifies a natural person described in the individual deletion condition (hereinafter also referred to as "person concerned") of the movement of the content to the trash folder 40B, when an operation satisfying the individual deletion condition is included in the operation history. The notification method by the notification unit 45 includes transmission of a mail addressed to the person concerned, displaying a warning attention screen on the operation screen of the terminal apparatus, outputting sound from the terminal apparatus, or the like. The notification unit 45 here is an example of a notification unit.

This notification has the effect of making a person concerned notice the possibility of deletion of highly important content related to the person concerned at an early stage (immediately after movement to the trash folder). Further, immediately after the movement to the trash folder 40B, it is also possible for the person concerned to restore the corresponding content from the trash folder before the content is deleted from the trash folder 40B.

In addition, the controller 31 also includes a display controller 46 that selectively displays only content having an operation history matching the individual deletion condition or highlights only the history portion matching the individual deletion condition, among the information on the content selected to be displayed, when listing information items on the content moved to the trash folder 40B. The display controller 46 is an example of the "display controller" in the exemplary embodiment of the invention.

Although the number of pieces of content stored in the trash folder 40B is enormous, it is possible to display only content having an operation history matching the individual deletion condition. Further, although the number of operation histories corresponding to one piece of content is still enormous, only the history portion matching the individual deletion condition is highlighted.

Setting of Individual Deletion Condition

Figure 5:
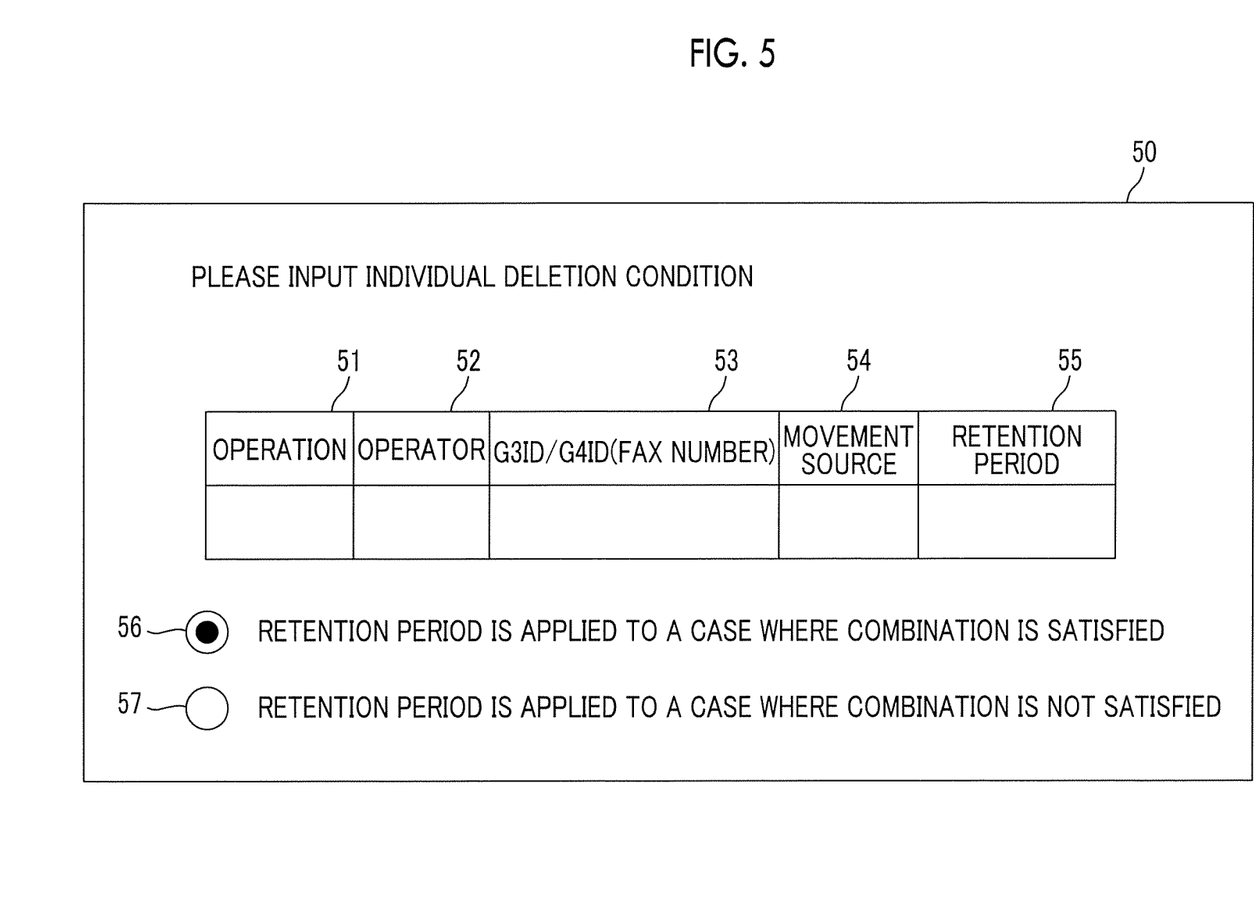
FIG. 5 is a diagram showing a screen example used for setting an individual deletion condition.

FIG. 5 is a diagram showing a screen example used for setting an individual deletion condition. The operation screen 50 shown in FIG. 5 has an operation 51, an operator 52, a FAX number 53, a movement source 54, and a retention period 55 as fields of input items. The types of the fields of the input items constituting the operation screen 50 and the combination thereof are only an example, and other fields may be provided or only some fields may be provided. However, in many cases, the operation screen 50 has at least the operation 51 and the retention period 55.

The field of the operation 51 is used for designating the type and content of the above-described operation. In this field, for example, collected operations are selectively displayed so as not to overlap the operation history of the content handled by the cloud server 30. The field of the operator 52 is a field used for specifying a person who performs the operation. In this field, for example, information (personal name, employee number, or the like) for identifying a natural person and a system name are presented selectably. The field of the FAX number 53 is a field used for identifying a communication partner. The field of the movement source 54 is a field used for designating the folder in which the content before movement has been stored. The field of the retention period 55 is a field used for designating a period for storing content in the trash folder 40B. For example, the retention period is selected from 1 day, 3 days, 5 days, 10 days, and 30 days.

A selection button 56 to be checked in a case where "satisfying" a combination of information set in the input field is used as an application condition of the retention period, and a selection button 57 to be checked in a case where "not satisfying" a combination of information set in the input field is used as an application condition of the retention period are provided on the operation screen 50.

Deletion Management Operation by Controller

Figure 6:
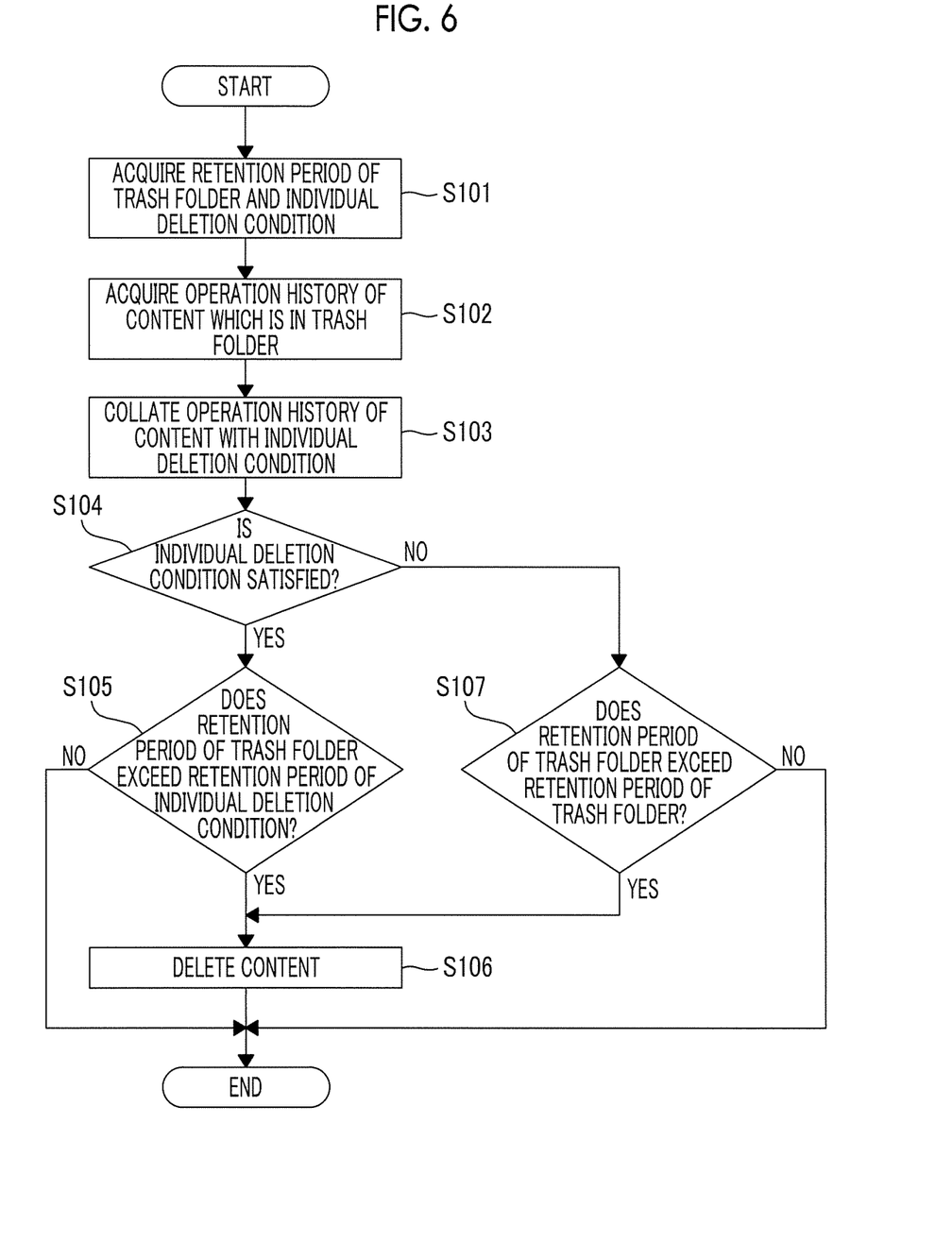
FIG. 6 is a flowchart for explaining a content deletion operation from a trash folder.

Here, the processing operation realized by the execution of a program will be described. FIG. 6 is a flowchart for explaining a content deletion operation from the trash folder 40B. In addition, the flowchart shown in FIG. 6 is executed on a content basis. That is, after the process shown in FIG. 6 is executed for one piece of content, the same process is executed for another piece of content.

First, the controller 31 acquires the retention period set in the trash folder 40B and the individual deletion condition (step 101). In the case of the exemplary embodiment, the retention period of the trash folder 40B is, for example, 3 days. In many cases, plural individual deletion conditions are set. Next, the controller 31 acquires the operation history of the content which is set as content to be processed, among content items in the trash folder 40B (step 102).

Subsequently, the controller 31 collates the operation history of the content with the individual deletion condition, and determines the presence or absence of the individual deletion condition included in the combination of the items constituting the operation history (steps 103 and 104). In a case where there is even one individual deletion condition that the operation history satisfies, the controller 31 obtains a positive result and proceeds to step 105. On the other hand, in a case where there is no individual deletion condition that the operation history satisfies, the controller 31 obtains a negative result and proceeds to step 107.

The controller 31 that has proceeded to step 105 determines whether or not the retention period of the content to be processed in the trash folder 40B exceeds the retention period of the corresponding individual deletion condition. In a case where there are plural individual deletion conditions corresponding to the operation history of the content to be processed, the controller 31 uses the longest retention period.

In a case where the retention period is not exceeded, saving to the trash folder 40B is to be continued, so the controller 31 obtains a negative result and terminates the process here. On the other hand, in a case where the retention period is exceeded, the controller 31 obtains a positive result, deletes the corresponding content from the trash folder 40B, and shifts to the next process of content (step 106). That is, the controller 31 deletes the corresponding content according to the collation result between the individual deletion condition and the operation history.

On the other hand, the controller 31 that has proceeded to step 107 determines whether or not the retention period of the content to be processed in the trash folder 40B exceeds the retention period of the trash folder 40. In this manner, the processing operation of step 107 is executed for the content in which there is no individual deletion condition that the operation history satisfies.

In a case where the retention period is not exceeded, saving to the trash folder 40B is to be continued, so the controller 31 obtains a negative result and terminates the process here. On the other hand, in a case where the retention period is exceeded, the controller 31 obtains a positive result, deletes the corresponding content from the trash folder 40B, and shifts to the next process of content (step 106).

Subsequently, with respect to some cases, the operation of deleting content from the trash folder 40B will be described.

Case 1

Figure 7:
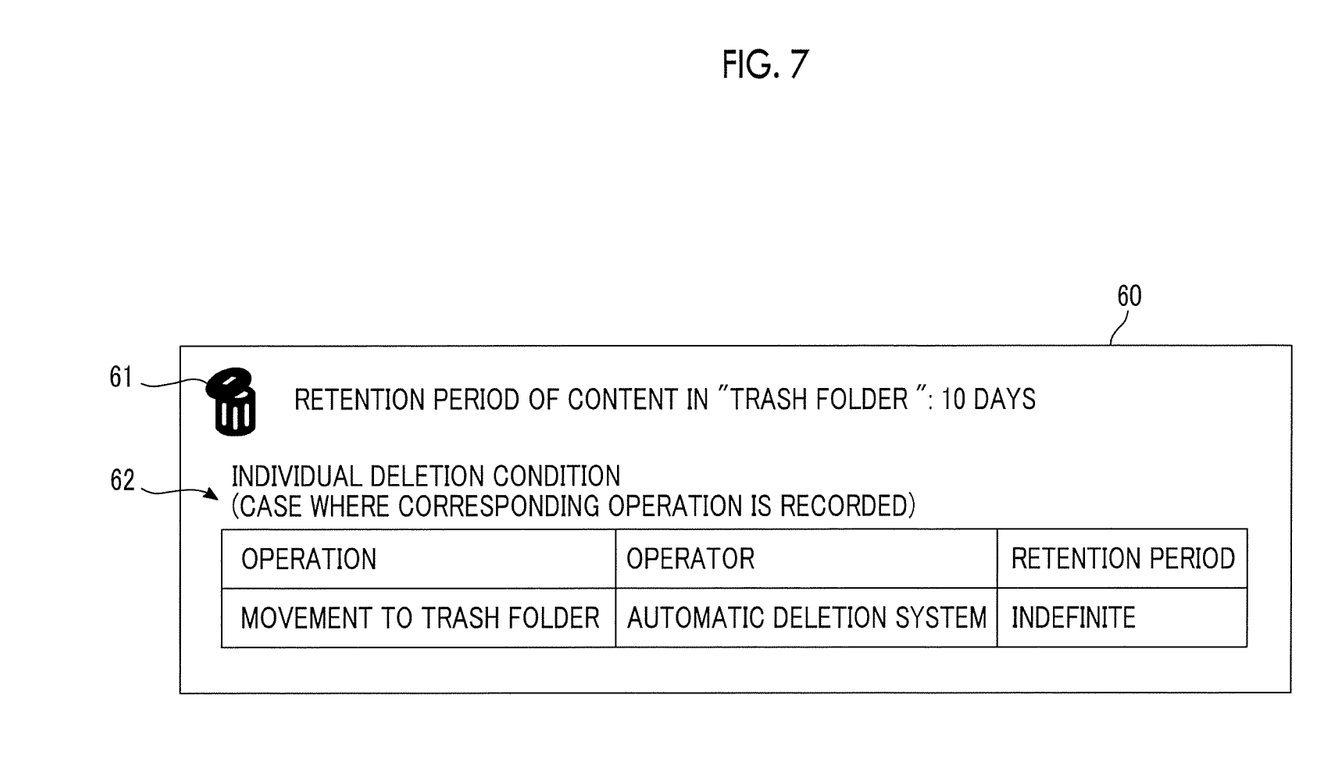
FIG. 7 is a diagram showing an example of a confirmation screen of an individual deletion condition.

FIG. 7 is a diagram showing an example of a confirmation screen of the individual deletion condition. In the case of the confirmation screen 60, the retention period of the trash folder 40B is 10 days (item 61), and the application condition of the retention period (item 62) satisfies the combination of the details set for the operation and the operator (recorded). In the example of FIG. 7, it is defined that the content including the operation history in which operation is "movement to a trash folder" and the operator is "automatic deletion system" is to be stored in the trash folder 40B indefinitely.

This is because the user's intention is not reflected in automatic movement to the trash folder 40B by the automatic deletion system. With this setting, it is possible to prevent content for which user's deletion intention is not confirmed, from being deleted from the trash folder 40B, without the user's knowing. On the other hand, if this individual deletion condition is not satisfied, that is, with respect to the manual operation by the user to move the content to the trash folder 40B, the content is automatically deleted 10 days after it is moved to the trash folder 40B.

Figure 8:
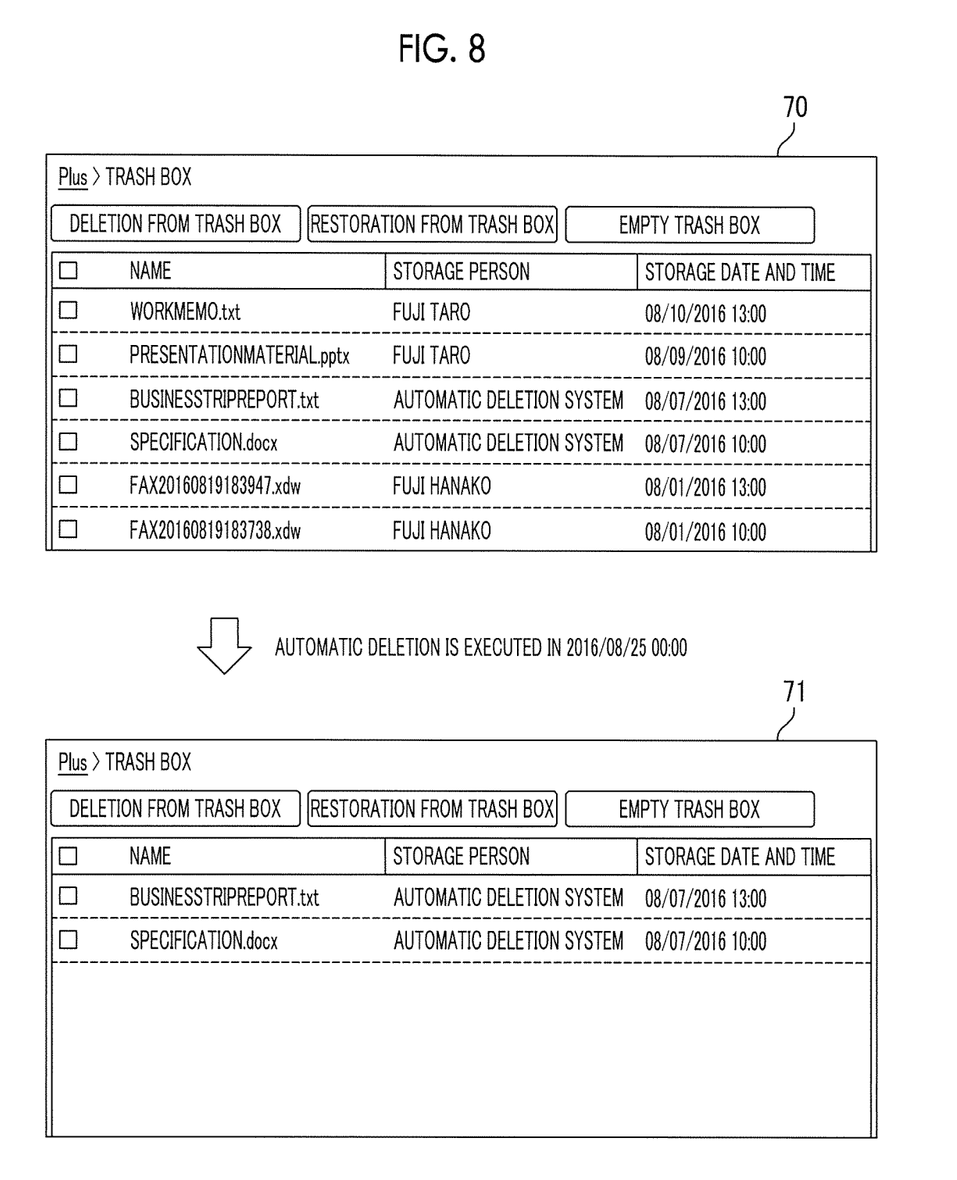
FIG. 8 is a diagram showing a change before and after execution of automatic deletion in a case where a browsing screen of a trash folder is shown in a detailed format.

FIG. 8 is a diagram showing a change before and after execution of automatic deletion in a case where the browsing screen of the trash folder 40B is shown in a detailed format. The browsing screen 70 positioned in the upper row represents information (name, storage person, storage date and time) on the content stored in the trash folder 40B before execution of automatic deletion. In this example, six content items are included in the trash folder 40B. The browsing screen 71 positioned in the lower row represents information (name, storage person, storage date and time) on the content stored in the trash folder 40B after execution of automatic deletion. In this example, only the two content items remains of which the operator moving content to the trash folder 40B is "automatic deletion system", and the other content items are deleted.

Case 2

Figure 9:
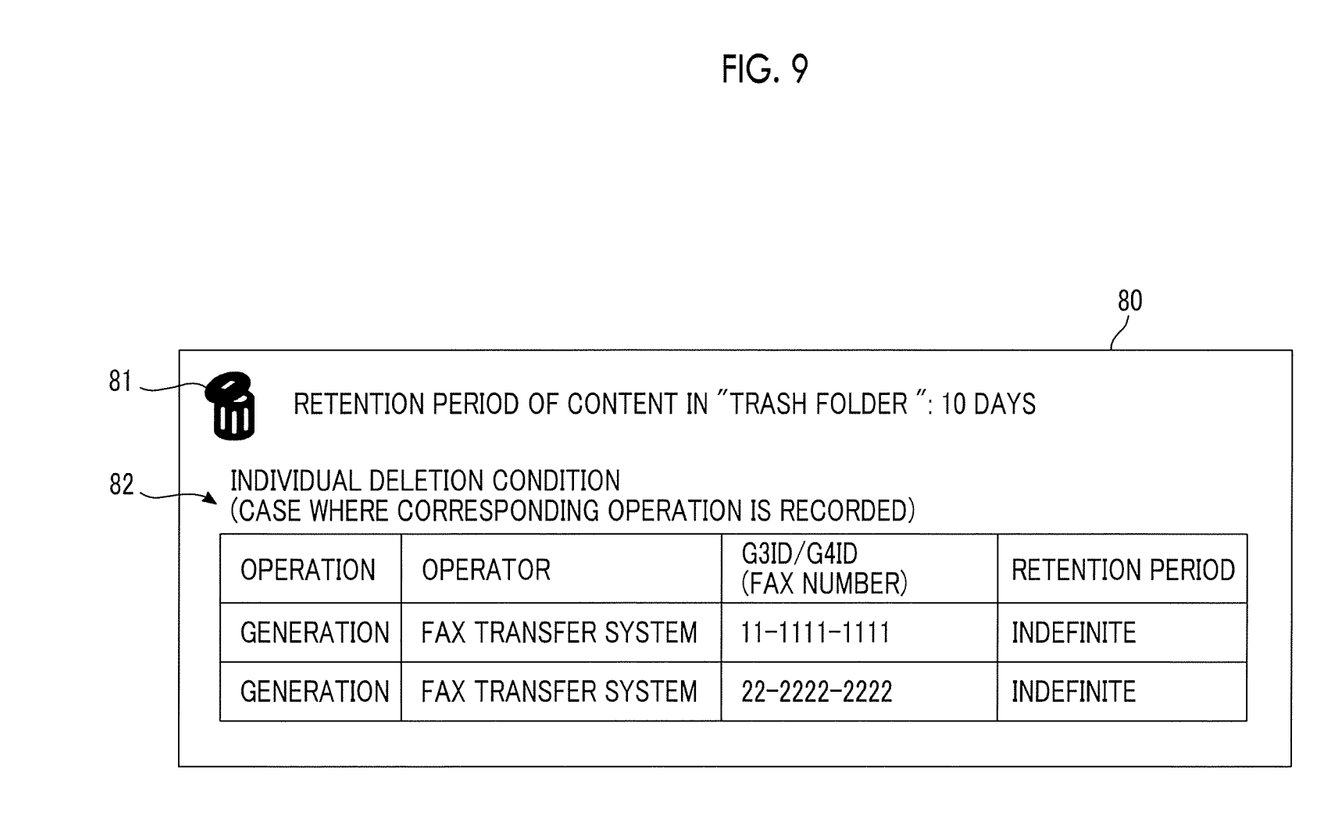
FIG. 9 is a diagram showing another example of the confirmation screen of the individual deletion condition.

FIG. 9 is a diagram showing another example of the confirmation screen of the individual deletion condition. In a case of the confirmation screen 80, the retention period of the trash folder 40B is 10 days (item 81), and the application condition of the retention period (item 82) satisfies the combination of details set for the operation, the operator and the FAX number (recorded). In the example of FIG. 9, it is defined that content including an operation history in which an operation is "generation", the operator is "FAX transfer system", and the FAX number is "11-1111-1111" or "22-2222-2222" is stored in the trash folder 40B indefinitely.

In the fax transmitter and receiver, a large amount of received documents are transferred on a daily basis, with the content folder 40A as the storage folder. Therefore, in the content folder 40A, since a space for storing the continuously transferred content is provided, the content exceeding the retention period is automatically moved to the trash folder 40B. In this movement, it is not determined whether or not the content to be moved is a document received from an important customer. Therefore, in the exemplary embodiment, when a specific FAX number is included in the operation history of the content transferred to the trash folder 40B, in order to preserve the possibility of confirmation and restoration by users, a retention period longer than the retention period of the trash folder 40B is set. The example in FIG. 9 is indefinite. The content including the operation history that does not match the individual deletion condition is automatically deleted after the elapse of the retention period set in the trash folder 40B.

Case 3

Figure 10:
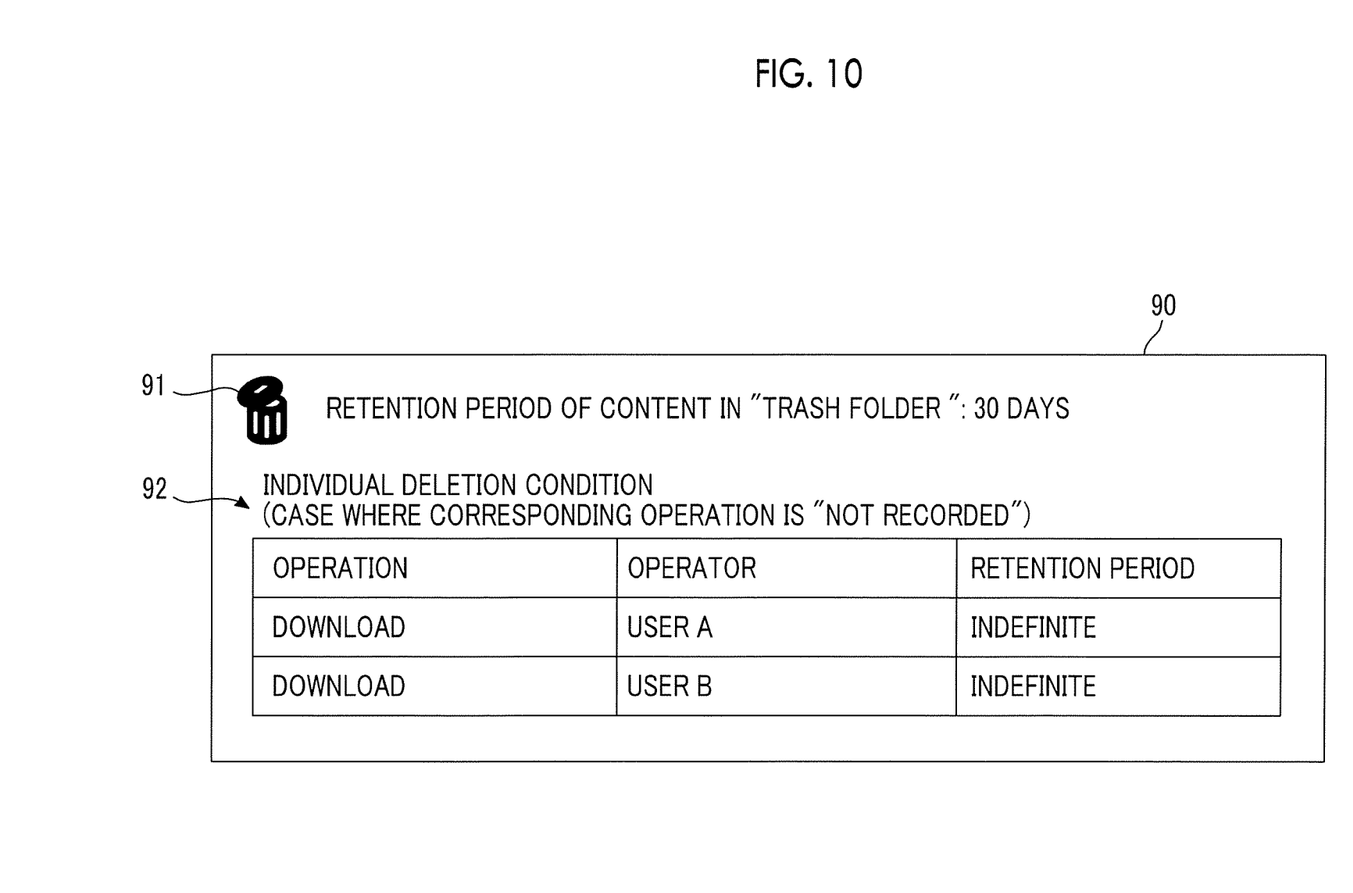
FIG. 10 is a diagram showing still another example of the confirmation screen of the individual deletion condition.

FIG. 10 is a diagram showing another example of the confirmation screen of the individual deletion condition. In the case of the confirmation screen 90, the retention period of the trash folder 40B is 30 days (item 91), and the application condition of the retention period (item 92) does not satisfy the combination of details set for the operation and the operator (not recorded). FIG. 10 corresponds to the individual deletion condition in the case where the selection button 57 (see FIG. 5) is checked on the setting screen.

In the example of FIG. 10, the content that does not include the operation history in which the operation is "download" and the operator is "user A" is stored in the trash folder 40B indefinitely. For example, with respect to the content that the user A who is a key person has not downloaded to the terminal apparatus (that is, it is not acquired), even after being moved to the trash folder 40B, the content is stored until there is a download operation by the user A.

If the content is important, the user A may restore the corresponding content from the trash folder 40B to a different folder (for example, the content folder 40A or a folder in the terminal apparatus). Further, if it can be checked that the content is not important, the user A may manually delete the content from the trash folder 40B. Even if the user A does not delete the content manually, since the history of the download operation by the user A remains, the content is automatically deleted after the elapse of 30 days which is the retention period of the trash folder 40B. Further, the content having the operation history that the user A has performed the upload operation is also automatically deleted after the elapse of 30 days which is the retention period of the trash folder 40B.

Case 4

Figure 11:
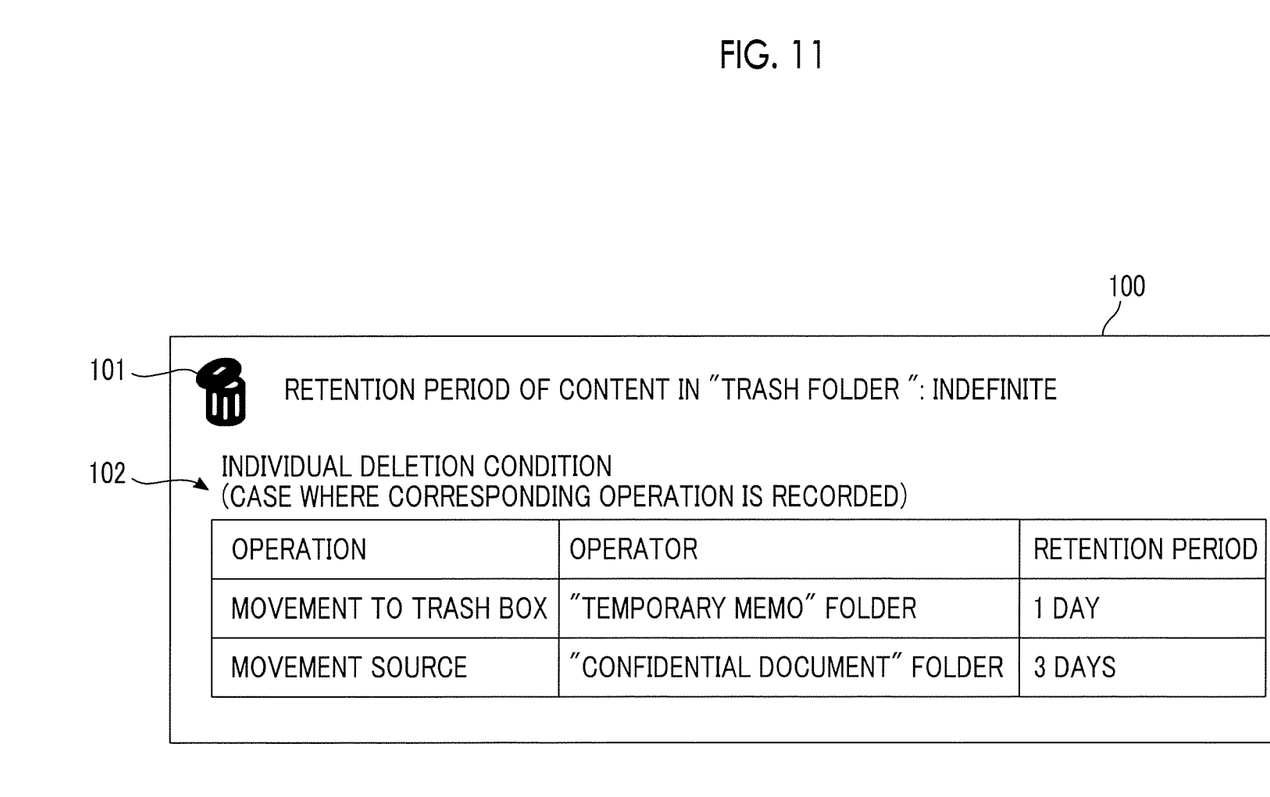
FIG. 11 is a diagram showing further still another example of the confirmation screen of the individual deletion condition.

The individual deletion condition can also be used to delete the content earlier than the retention period of the trash folder 40B. FIG. 11 is a diagram showing another example of the confirmation screen of the individual deletion condition. In the case of the confirmation screen 100, the retention period of the trash folder 40B is indefinite (item 101), and the application condition of the retention period (item 102) satisfies the combination of details set for the operation and the movement source (recorded).

In the example of FIG. 11, it is defined that the content including the operation history in which the operation is "movement to trash box" and the movement source is "temporary memo folder" is deleted from the trash folder 40B in 1 day. This is because there is no problem in many cases even if the temporarily generated content is deleted earlier.

In an another example of FIG. 11, it is defined that the content including the operation history in which the operation is "movement to trash box" and the movement source is "confidential document folder" is deleted from the trash folder 40B in 3 days. Highly confidential content needs to be reliably deleted.

Display Example of Browsing Screen of Trash Folder

Figure 12:
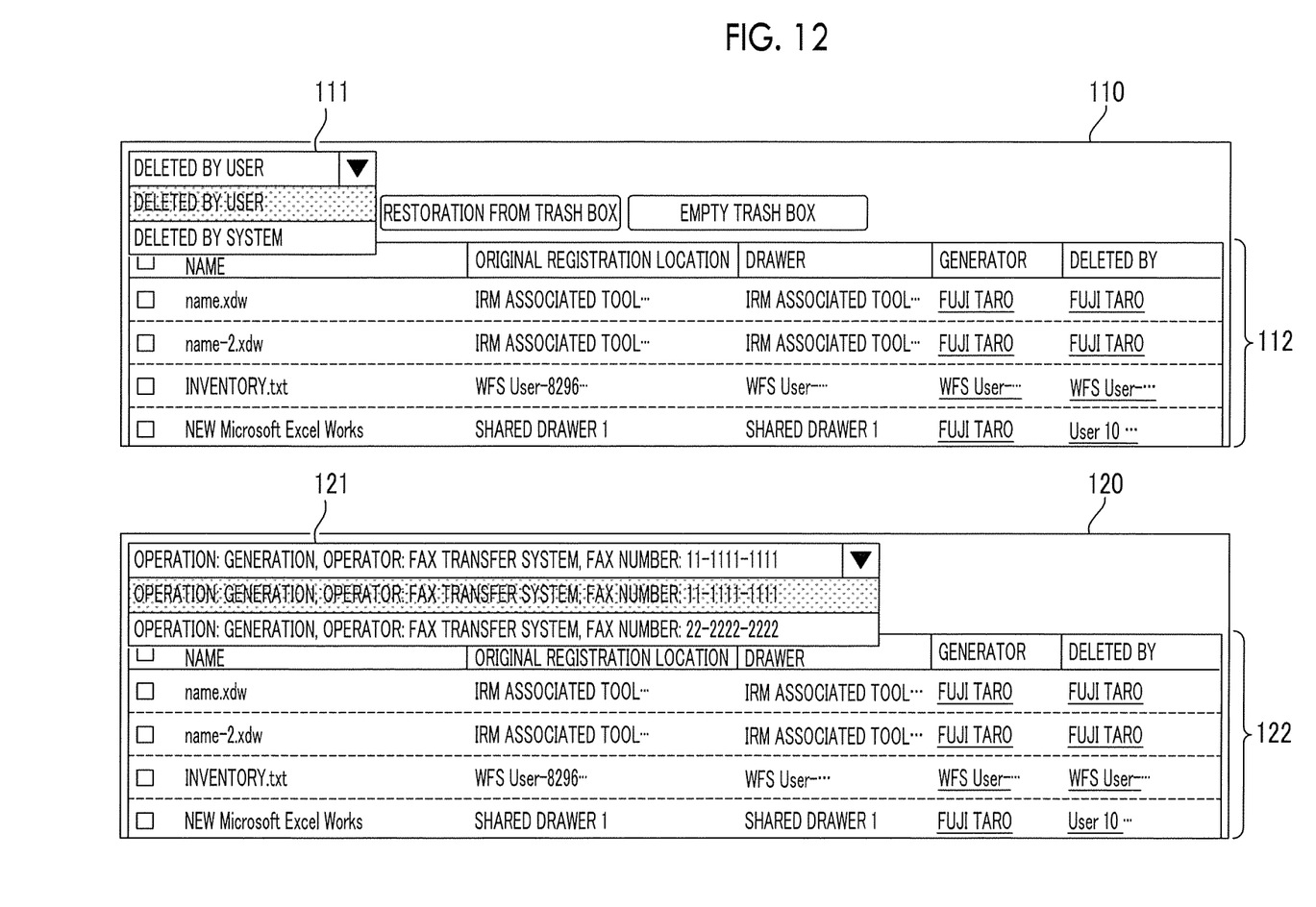
FIG. 12 is a diagram showing an example of refinement items displayed on the browsing screen of the trash folder.

Here, a display example of the browsing screen of the trash folder 40B using the individual deletion condition will be described. FIG. 12 is a diagram showing an example of refinement items displayed on the browsing screen of the trash folder 40B. On the browsing screen 110 positioned in the upper row, the refined result in the case where "Deleted by user" is selected from the two candidates displayed in the refinement condition field 111 ("Deleted by user" and "Deleted by system") is displayed in the display field 112.

On the other hand, on the browsing screen 120 positioned in the lower row, the refined result in the case where "FAX number is 11-1111-1111" is selected from the two candidates displayed in the refinement condition field 121 ("operation: generation, operator: FAX transfer system, FAX number: 11-1111-1111" and "operation: generation, operator: FAX transfer system, FAX number: 22-2222-2222") is displayed in the display field 122.

As in the display example, by using the individual deletion condition as the refinement condition in a case of displaying the information on a large amount of content stored in the trash folder 40B, it is possible to easily check highly important content among the content items stored in the trash folder 40B.

Figure 13:
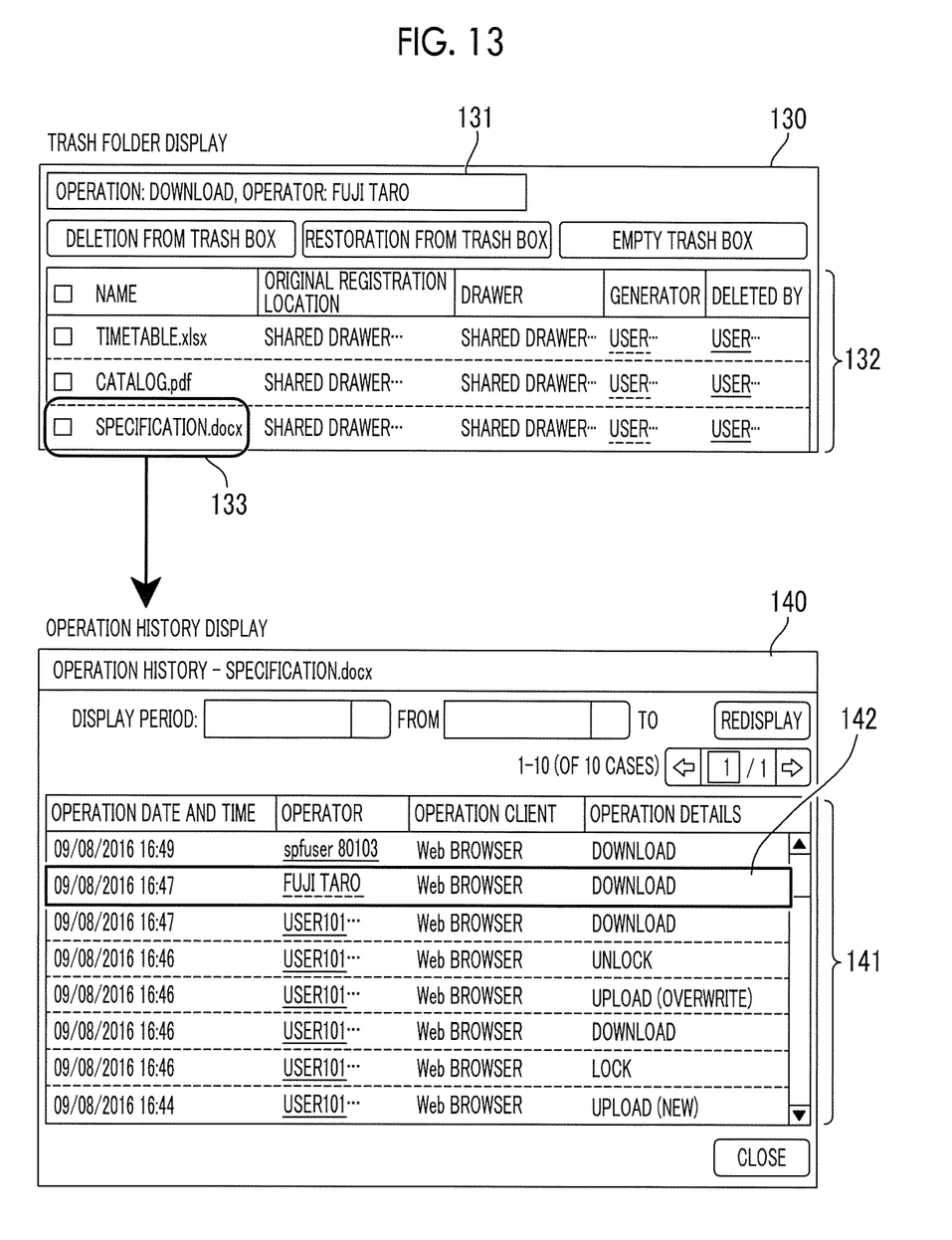
FIG. 13 is a diagram showing an example of displaying an operation history of a specific content from the browsing screen of the trash folder.

FIG. 13 is a diagram showing an example of displaying an operation history of a specific content from the browsing screen of the trash folder 40B. On the browsing screen 130 positioned in the upper row, the refined result in the case where "operation: download and operator: Fuji Taro" is designated in the refinement condition field 131 is displayed in the display field 132. Here, the operation history screen 140 in the case where the file name "specification.docx" is selected among three content items displayed in the display field 132 is selected (reference numeral 133) is shown in the lower row.

In the display field 141 of the operation history screen 140, a list of past operation history of "specification.docx" is displayed. In the example of FIG. 13, eight operation histories are displayed on the screen. However, in this type of list display, it is difficult to check which operation satisfies the individual deletion condition. Therefore, in the example of FIG. 13, the operation history positioned in the second row from the top of the display field 141 is highlighted (reference numeral 142). Highlighting includes a method of brightening the background of the corresponding line, a method of attaching an asterisk to the head of a line, a method of setting the font of the corresponding line as bold letters, a method of changing the color of the font of the corresponding line to a color different from that of other lines, and the like.

As in the display example, by highlighting the operation history corresponding to the individual deletion condition, even in a case where the number of operation histories displayed in the display field 141 of the operation history screen 140 reaches a large number, it is possible to easily check the operation history matching the individual deletion condition.

Other Exemplary Embodiments

In the above exemplary embodiment, the case has been described where the deletion of the content from the trash folder 40B managed on the cloud server 30 is controlled depending on the individual deletion condition, but the folder to which the individual deletion condition is applied is not limited to the trash folder 40B managed on the cloud server 30.

For example, in a system that hierarchically selectively uses recording areas or recording mediums according to the frequency of use, the destination recording area or recording medium to which the content is moved from the original recording area or recording medium may be used as "different recording location" in the exemplary embodiment of the invention. Further, the folder need not be a folder managed on the cloud server 30.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information management apparatus comprising:
    a controller that controls deletion of content whose history of operations performed on the content satisfies a specific condition among content items which satisfy a predetermined condition and are moved to a different recording location, wherein the controller collates the specific condition with the history of operations performed on the content and determines whether to execute the deletion according to a collation result before deleting the content; and
    a display controller that performs control so as to display the content having the history of operations matching the specific condition when listing information pieces on the content moved to the different recording location.

2. The information management apparatus according to claim 1, further comprising:
    a notification unit that makes a notification to the operator, when the content having the history of operations matching a combination of the operation detail and the operator defining the specific condition is moved to the different recording location.

3. The information management apparatus according to claim 2,
    wherein the different recording location is a trash folder in which the deleted content is stored.

4. The information management apparatus according to claim 1,
    wherein the display controller highlights a history portion matching the specific condition, when listing the history of the operations performed on the content.

5. The information management apparatus according to claim 1,
    wherein in a case where the history of the operations performed on the content matches a plurality of specific conditions, the controller applies a longer retention period among retention periods defined in the plurality of specific conditions to the deletion of the content.

6. The information management apparatus according to claim 1,
wherein the controller excludes specific content from deletion targets.

7. A non-transitory computer readable medium storing a program causing a computer to execute a process, the process comprising:
controlling deletion of content whose history of operations performed on the content satisfies a specific condition among content items which satisfy a predetermined condition and are moved to a different recording location, wherein the specific condition with the history of operations performed on the content is collated and whether to execute the deletion according to a collation result is determined before deleting the content; and
performing control so as to display the content having the history of operations matching the specific condition when listing information pieces on the content moved to the different recording location.

* * * * *